Oct. 23, 1934.  J. FREUD  1,978,192
SQUEEGEE
Filed Dec. 2, 1932
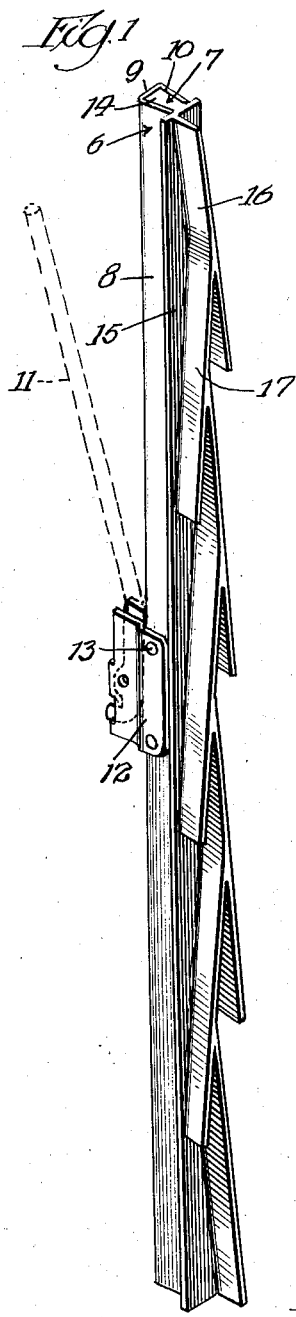
Fig.1
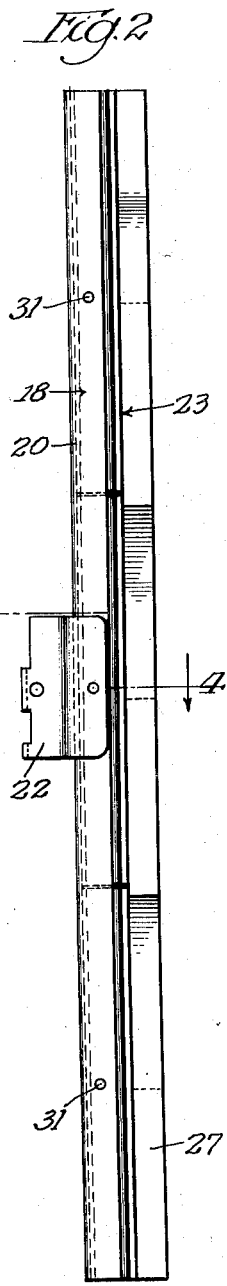
Fig.2
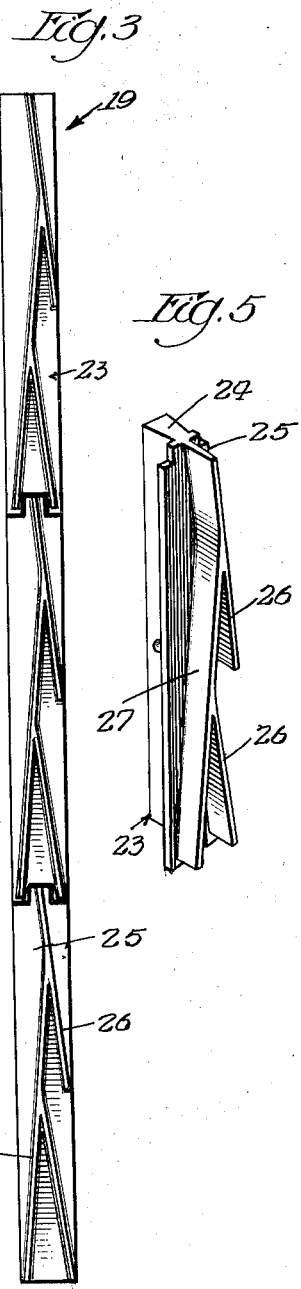
Fig.3
Fig.5
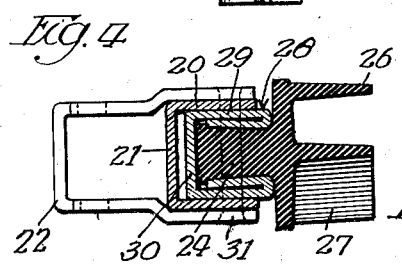
Fig.4
Inventor
Joseph Freud
By Fred Gerlach
his Atty.

Patented Oct. 23, 1934

1,978,192

UNITED STATES PATENT OFFICE 1,978,192

SQUEEGEE

Joseph Freud, Chicago, Ill.

Application December 2, 1932, Serial No. 645,341

7 Claims. (Cl. 15—245)

The present invention relates generally to squeegees for drying and cleaning windows, panels and other smooth-faced parts. More particularly, the invention relates to that type of squeegee which is designed primarily for use in connection with the wiping of the windshield of an automobile and comprises an elongated, U-shaped holder which is adapted to be oscillated or shifted either manually or mechanically across the outer face of the windshield and holds between the sides thereof, a rubber strip for effecting wiping of the windshield during oscillation or shift of the holder.

One object of the invention is to provide a squeegee of this type which is exceedingly efficient in connection with the removal of sleet, snow and ice and is more durable and effective than previously designed squeegees of the same general character by virtue of the fact that the rubber strip embodies on the operative face thereof a longitudinally extending series of integral, comparatively thin blades which are angled relatively to the longitudinal center of the strip and operate during oscillation or shift of the holder by virtue of their angular position, to increase the shearing action on the water, sleet or snow on the windshield.

Another object of the invention is to provide a squeegee of the last mentioned character in which every other blade on the rubber strip is angled in one direction with respect to the longitudinal center of the strip and the alternate blades are angled in the opposite direction so that combined shearing and wiping of the water, sleet or snow from the windshield is efficient in the fore, as well as the return stroke of the holder.

Another object of the invention is to provide a windshield-wiping squeegee in which the rubber strip is formed of sections which are arranged in end-to-end relation and are connected pivotally to the holder so that they are free to swing to a limited extent in the direction of the windshield in order individually to accommodate themselves to the outer surface of the windshield.

A further object of the invention is to provide a squeegee of the last mentioned character in which the sections which form the rubber strip are pivotally connected to the holder by means of U-shaped, sheet metal clips, the sides of which are bent so as to interlock with the base or attaching parts of the sections.

A still further object of the invention is to provide a squeegee which is generally of new and improved construction, may be manufactured at a low and reasonable cost and is exceedingly durable and well adapted for the purpose for which it is designed.

Other objects of the invention and the various advantages and characteristics of the present squeegee construction will be apparent to those skilled in the art from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective of a squeegee embodying one form of the invention;

Figure 2 is a side view of the form of the invention wherein the rubber strip is divided into sections which are arranged in end-to-end relation and are connected pivotally to the holder;

Figure 3 is a front view of the squeegee of Figure 2;

Figure 4 is an enlarged sectional view on the line 4—4 of Figure 2 showing in detail the manner in which the sections which form the rubber strip are attached to the clips and are connected pivotally to the holder so that they are free to swing individually and to a limited extent to and from the windshield against which the squeegee is applied; and Figure 5 is a perspective of one of the sections of the rubber strip.

The squeegee which is shown in Figure 1 of the drawing and constitutes one form of the invention is designed primarily for use in connection with the wiping of the windshield of an automobile and is adapted to be oscillated over a portion of the windshield or to be shifted longitudinally of the windshield either manually or mechanically. It is of unitary character and comprises an elongated holder 6 and a strip of rubber or like resilient material 7. The holder 6 is formed of sheet metal and is adapted to extend substantially vertically. It consists of a pair of laterally spaced sides 8 and an intermediate wall 9. The sides 8 shown in Figure 1 converge towards their outer margins so as to form with the intermediate wall 9 a channel 10 of dovetail cross section. The intermediate wall 9 is formed integrally with the sides 8 and serves to space the latter apart. The holder 6 is adapted to be connected to the distal end of an actuating arm 11 by means of a bracket 12. This bracket is attached by rivets 13 to the central part of the holder and is designed so that it may be attached removably to the arm 11.

The rubber strip 7 is coextensive with the holder 6 and consists of a base or attaching part 14, a flange part 15, a longitudinal series of blades 16 and a longitudinal series of blades 17. The attaching part 14 is formed integrally with the flange part 15. It fits snugly within and fills the channel 10 and serves to hold the strip and holder in connected relation. The sides of the attaching part 14 are preferably formed so that they diverge from the flange part 15 and thus interlock with the sides 8 of the holder. The rivets 13 for attaching the bracket 12 to the holder are preferably arranged so that they extend through the sides of the holder and the attaching part 14 of the strip in order permanently to connect the strip to the holder. The flange part 15 is flat and comparatively narrow and projects laterally in opposite directions from the front portion of the attaching part 14 so that it laps and extends outwardly from the edges of the sides 8 of the holder.

The blades 16 are formed integrally with and project forwardly from the flange part 15 and are substantially of the same thickness. They extend in end-to-end relation from one end of the strip 7 to the other and are slightly angled in one direction with respect to the longitudinal center of the strip in order to effect a pronounced shearing action when the holder is oscillated or moved in one direction for the purpose of efficiently wiping water, sleet or snow from the windshield against which the squeegee is applied. The upper end of each blade 16 is adjacent, but is spaced laterally from the lower end of the contiguous blade 16. The blades 17, like the blades 16, are formed integrally with and project forwardly from the flange part 15 of the strip. They are of the same thickness as the blades 16 and extend in end-to-end relation from one end of the strip to the other. In addition, they alternate with the blades 16 and are angled in the reverse direction relatively to the longitudinal center of the strip so that they produce the desired combined shearing and wiping effect upon return or reverse oscillation or shift of the holder by the arm 11. The upper ends of the blade 17 are joined to and formed integrally with the central portions of the blades 16 and the upper ends of the blades 16 are joined to and formed integrally with the central portions of the blades 17. As a result of this arrangement, the lower ends of the blades 16 and 17 are free and hence make the strip exceedingly resilient as far as wiping is concerned. A further advantage in this arrangement resides in the fact that the blades are in a measure independently flexible with the result that they accommodate themselves to any irregularity in the outer face of the windshield. By angling the blades 16 in one direction and the blades 17 in the opposite direction, combined shearing and wiping of the water, sleet and snow from the windshield is effected on the fore, as well as the reverse stroke of the holder.

In operation of the squeegee, the arm 11 either oscillates the holder 8 or shifts it longitudinally of the windshield as the case may be. During the fore stroke of the holder, one series of blades operates to effect wiping of the windshield by a shearing action upon the water, sleet or snow and during the reverse or return stroke, the other series is brought into operation for wiping purposes. Thus, during oscillation or shift of the holder, the blades 16 and 17 alternately effect the desired wiping of the windshield and by virtue of their construction, efficiently rid the windshield of any water, sleet or snow appearing thereon. In view of the manner in which the blades of one series are united to the blades of the other series, the space between the lower end of each blade and the upper end of the adjoining blade opens downwardly so that full drainage is effected and there is no likelihood of sleet or snow gathering thereon.

The squeegee which is shown in Figures 2, 3, 4 and 5 of the drawing and constitutes another form of the invention, is designed for the same use as the squeegee of Figure 1. It consists of an elongated, U-shaped holder 18 and a rubber wiping strip 19. The holder 18 is adapted to extend vertically and consists of a pair of side walls 20 and an intermediate wall 21. The side walls, as shown in Figure 4, are parallel and are held in spaced relation by means of the intermediate wall 21. A bracket 22 similar to the bracket 12 of the squeegee of Figure 1, serves to connect the holder 18 to an actuating arm (not shown) whereby it is either manually or mechanically oscillated or shifted lengthwise of the windshield to which the squeegee is applied. The strip 19 consists of a plurality of sections 23. These sections are arranged in end-to-end relation, as shown in Figures 2 and 3, and extend longitudinally to the holder 18.

Each of the sections 23 consists of an attaching part 24, a flange part 25, a pair of blades 26 and a blade 27, and is mounted in a U-shaped, sheet metal clip 28. This clip fits between the sides 20 of the holder 18 and comprises a pair of laterally spaced sides 29 which are connected together by an intermediate wall 30 and have the outer margins thereof bent inwardly and doubled back so as to form therebetween a channel of dovetail cross section. The attaching part 24 of the section is formed integrally with the flange part 25 and is of dovetail design so as to fit snugly within and substantially fill the channel between the sides 29 of the clip. The flange part 25 is substantially flat and extends laterally in opposite directions from the front portion of the attaching part 25 and laps the doubled over or bent parts of the sides of the clip. The blades 26 are comparatively thin and are formed integrally with and project forwardly from the front face of the flange part 25. They are positioned one above the other and are inclined or angled in one direction relatively to the longitudinal center of the section so as to impart a shearing effect or action in connection with wiping. The upper of the two blades extends from the central portion of the section to the upper end. The lower blade extends from the lower end of the section slightly below the central portion and is parallel with the upper blade. The blade 27 is formed integrally with, and projects forwardly from the flange part 25 and is inclined or angled in the opposite direction with respect to the longitudinal center of the section. It extends upwardly from the lower end of the section and has the upper end thereof joined to, and formed integrally with, the central portion of the upper blade 26. The upper end of the lower blade 26 is joined to, and formed integrally with the central portion of the blade 27. The upper end of the upper blade 26 is associated with a reduced part which fits within notches in the lower end of the superjacent section in order that there is an overlap of the blades.

The clips 28 in which are disposed the anchor parts 24 of the sections of the strip, are coextensive with the sections and are connected to the holder 18 by pivot studs 31 so that the strip sections are free to swing vertically in the direction of the windshield in order individually to accommodate themselves to the surface of the windshield. The pivot studs 31 extend through and are carried by the sides 20 of the holder 18 and extend through the central portions of the sections and the clips 28. In order to allow independent limited pivotal movement of the clips and strip sections, the pivot studs 31 are arranged so that the intermediate walls 30 of the clips are spaced slightly from the intermediate wall 21 of the holder 18.

During operation of the squeegee of Figures 2, 3, 4 and 5, the holder 18 is oscillated or shifted longitudinally depending upon the type of mechanism to which the actuating arm for the bracket 32 is attached and during such oscillation or shift, the blades 26 and 27 effect an efficient wiping of the windshield by virtue of their inclined position. When the holder is shifted in one direction, the blades 26 are brought into play and effect cleaning and wiping of the windshield. When the holder is shifted into the opposite direction, the blade 27 serves to effect the desired cleaning and wiping of the windshield. By virtue of the fact that the strips which form or compose the strip 19 are pivotally connected to the holder and are mounted to swing individually in the direction of the windshield, they are free to adapt themselves to any irregularities appearing on the outer face of the windshield.

The herein disclosed squeegee constructions are comparatively simple and may be produced at a low and reasonable cost. By virtue of the fact that oppositely angled blades are utilized as the wiping instrumentality, the squeegee constructions are exceedingly efficient in operation and are extremely useful in connection with the cleaning of snow and sleet from the windshield.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A squeegee for wiping surfaces, comprising an elongated holder adapted to be shifted back and forth across the surface to be wiped, and a substantially coextensive strip of pliable material attached to the holder and embodying at the front face thereof two longitudinally extending series of comparatively thin, surface-engaging blades, the blades of one of the series being arranged in end-to-end relation and extending in one direction at an acute angle with respect to the longitudinal center of the strip so as to wipe the windshield by a shearing action in response to shift of the holder in one direction, and the blades of the other series alternating with the blades of said one series and extending in the opposite direction at an acute angle with respect to the longitudinal center of the strip so as to wipe the surface by a shearing action in response to shift of the holder in the opposite direction.

2. A squeegee for wiping surfaces, comprising an elongated holder adapted to extend substantially vertically and to be shifted back and forth across the surface to be wiped, a substantially coextensive strip of pliable material attached to the holder and embodying at the front face thereof two longitudinally extending series of comparatively thin, surface-engaging blades, the blades of one series being arranged in end-to-end relation and extending in one direction at an acute angle with respect to the longitudinal center of the strip so as to wipe the surface by a shearing action in response to shift of the holder in one direction, the blades of the other series alternating with the blades of the said one series and extending in the opposite direction at an acute angle with respect to the longitudinal center of the strip so as to wipe the surface by a shearing action in response to shift of the holder in the opposite direction, each of the blades of each series having the upper end thereof joined to the intermediate portion of the superjacent blade of the other series and having the lower end thereof free with respect to the subjacent blade.

3. A squeegee for wiping surfaces, comprising an elongated, U-shaped holder adapted to be shifted back and forth across the surface to be wiped, a substantially coextensive strip of pliable material consisting of an attaching part fitting within the channel in the holder, a flange part projecting laterally in opposite directions from the attaching part and lapping the edges of the sides of the holder, and a comparatively thin, flexible, blade-like member projecting forwardly from the flange part and extending at an acute angle with respect to the longitudinal center of the strip so as to effect wiping of the surface by a shearing action in response to the aforesaid shift of the holder.

4. A squeegee for wiping surfaces, comprising an elongated U-shaped holder adapted to be shifted back and forth across the surface to be wiped, a substantially coextensive strip of pliable material consisting of an attaching part fitting within the channel in the holder, a flange part projecting laterally in opposite directions from the attaching part and lapping the edges of the sides of the holder, and a longitudinally extending series of flexible surface-engaging blades projecting forwardly from the flange part and arranged in end-to-end relation and at an acute angle with respect to the longitudinal center of the strip so as to effect wiping of the surface by a shearing action in response to the aforesaid shift of the holder.

5. A squeegee for wiping surfaces, comprising an elongated, U-shaped holder of sheet metal adapted to be shifted back and forth across the surface to be wiped and having the outer margins of the sides thereof bent inwardly and doubled back so as to form between the holder sides a channel of dovetail shape, and a strip of pliable material extending lengthwise of and substantially coextensive with the holder, embodying a dovetail attaching part fitting within the channel and a forwardly projecting blade-element for effecting wiping of the surface in response to the aforesaid shift of the holder.

6. A squeegee for wiping surfaces, comprising an elongated, U-shaped holder of sheet metal adapted to be shifted back and forth across the surface to be wiped and having the outer margins of the sides thereof bent inwardly and doubled back so as to form between the holder sides a channel of dovetail shape, and a strip of pliable material extending lengthwise of and substantially coextensive with the holder, consisting of a dovetail attaching part fitting within the channel, a flange part projecting laterally in opposite directions from the attaching part and lapping the sides of the holder at the bent parts thereof, and a flexible, blade-element projecting forwardly from the flange part and extending at an acute angle with respect to the longitudinal center of the strip so as to effect wiping of the surface by a shearing action in response to the aforesaid shift of the holder.

7. As a new article of manufacture, a one-piece strip of rubber adapted for use in conjunction with the holder of a squeegee and consisting of a dovetail attaching part, a flange part projecting laterally in opposite directions from the front of the attaching part, and a longitudinal series of blades projecting forwardly from the flange part and extending at an acute angle with respect to the longitudinal center of the strip.

JOSEPH FREUD.